F. AESCHBACH.
MOLDING MACHINE.
APPLICATION FILED AUG. 22, 1916.
1,221,266.
Patented Apr. 3, 1917.
2 SHEETS—SHEET 1.
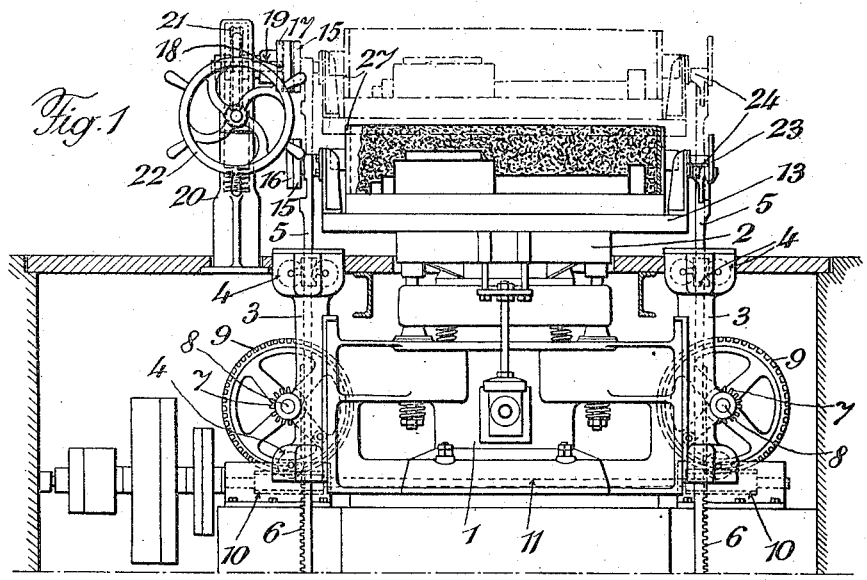
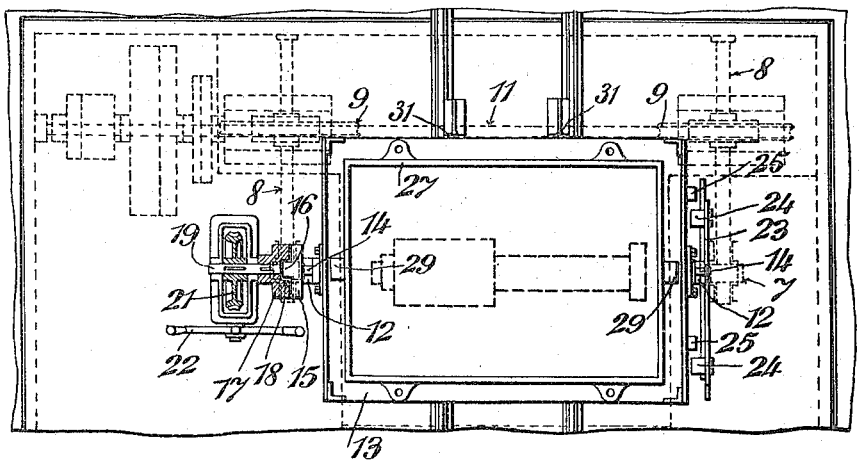
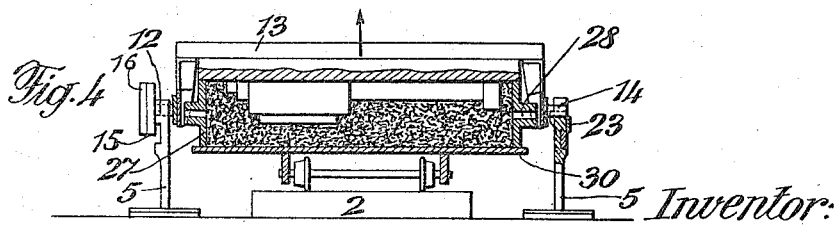
Inventor:
Friedrich Aeschbach,
By [signature]
Atty.

F. AESCHBACH.
MOLDING MACHINE.
APPLICATION FILED AUG. 22, 1916.
1,221,266.
Patented Apr. 3, 1917.
2 SHEETS—SHEET 2.
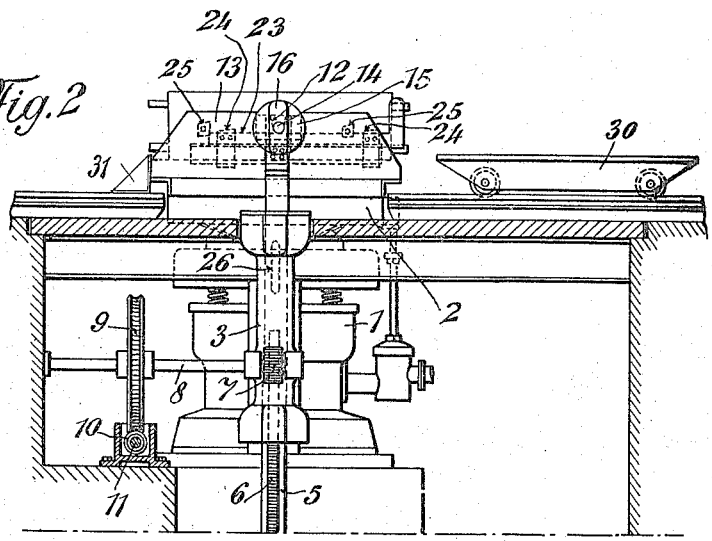
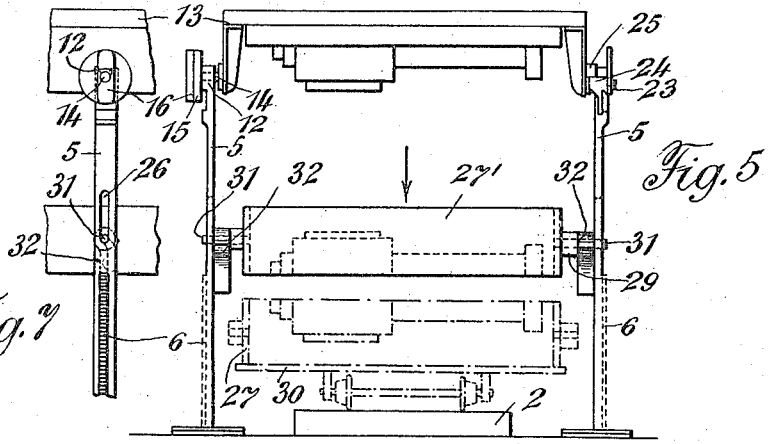
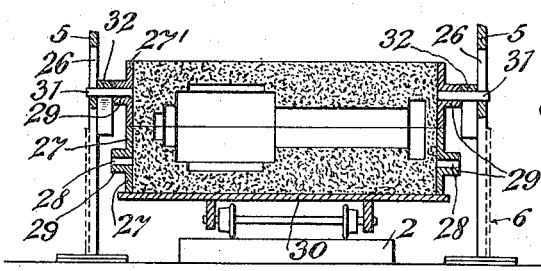
Inventor:
Friedrich Aeschbach
By Henry Orth
atty.

UNITED STATES PATENT OFFICE.

FRIEDRICH AESCHBACH, OF AARAU, SWITZERLAND.

MOLDING-MACHINE.

1,221,266. Specification of Letters Patent. Patented Apr. 3, 1917.

Application filed August 22, 1916. Serial No. 116,399.

*To all whom it may concern:*

Be it known that I, FRIEDRICH AESCHBACH, a citizen of the Republic of Switzerland, residing at Aarau, Switzerland, have invented certain new and useful Improvements in Molding-Machines; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

There are already known molding-machines provided with means for bringing together, lifting and rolling over the mold. These means comprise vertically adjustable supports, the upper ends of which carry a molding-table adapted to be put, together with a mold fixed thereto, on a molding-machine, for instance a shaking molding-machine, and to be lifted from said machine and rolled over. These known arrangements enable, however, only one part of the mold to be moved by means of these arrangements and to be brought with no more ado into a determinate position, for instance on a carriage, which is moved above the molding-machine, while the second part of the mold has still to be moved and placed in the proper manner upon the other part of the mold by means of auxiliary means, such as cranes, or by hand. Owing to this, such work can only be done by skilled workmen, especially founders, as it depends wholly on the skill of the workmen, that the second part of the mold comes to lie exactly in the required manner on the first mold-part. These known arrangements have also the great drawback, that they do not comprise any means for guiding the mold in a secure manner during its lowering by means of the cranes, as the mold is then only guided by hand, so that it may be easily damaged. Owing to these circumstances the bringing together of the mold-parts is still relatively very expensive notwithstanding the provision of mechanical means for lifting and rolling-over one part of the mold and moreover an exact bringing together of the mold-parts, without the molds being damaged, is not warranted under all conditions.

The object of the present invention is to provide a device for bringing together the mold-parts adapted to be used in molding-machines and avoiding a placing of the second mold-part on the first one by hand. This new device comprises vertically movable supports carrying in their upper ends a turnover plate adapted to take up a molding-box or flask. These supports are constructed in such a manner that they are also adapted to carry at a second place a molding-box, so that upon a placing of a molding-box on a suitable support, for instance a carriage, by means of the turnover plate a second molding-box may be placed in the required exact position on the first molding-box by means of said supports.

This invention will now be more particularly described with reference to the accompanying drawings, which illustrate a constructional example of the invention.

In these drawings:—

Figure 1 is a front view partly in section of a shaking molding-machine, constructed according to the present invention, Fig. 2 is a corresponding side view partly in section, Fig. 3 is a plan view partly in section;

Fig. 4 is a detail view, partly in section, of the turnover plate and molding box in the reverse of the position shown in Fig. 1.

Fig. 5 is a front view illustrating a step in the operation.

Fig. 6 is a vertical section of the molding boxes assembled, and

Fig. 7 is an end view of Fig. 5, some of the parts being omitted and others broken off.

In carrying the invention into effect as illustrated in the accompanying drawings I provide the shaking molding-machine 1 with a shaking-plate 2. This machine has standards 3, in which are guided vertically movable supports 5 by means of rolls 4. The lower part of each support 5 has the form of a toothed rack 6 and engages with a toothed wheel 7, which is fixed to a shaft 8 carrying also a worm-wheel 9. Each worm-wheel 9 meshes with a worm 10, all worms 10 being fixed to a common shaft 11. The direction of the thread of the worm-gearing 9, 10 as well as the ratio of transmission of the gearings relatively to one another are such, that upon a rotation of the shaft 11 the supports 5 are moved equally and in the same direction. The upper end of each support 5 has a recess or bearing 12. 13 denotes a turnover plate having pins 14 resting in said bearings 12. To one of the pins 14 is connected outside the corresponding support 5 a disk 15 provided with a transverse rib 16 extending thereacross. The disk 15 forms one half of a clutch, which is adapted to mesh with a clutch-half 17. In order to enable a coupling of the parts 15 and 17 I provide in the part 17 a groove 18 corresponding to the rib 16. The clutch-half 17 is fixed to a shaft 19 carrying also a worm wheel 21, said shaft 19 being mounted in a standard 20. The worm wheel 21 meshes with a worm adapted to be moved by means of a hand wheel 22. The other support 5 carries a horizontally movable rail 23, to which are fixed stops 24. These stops 24 are adapted to engage with lugs or stops 25 provided on a side of the turnover plate 13.

The supports 5 have also slots 26. 27, 27' denote molding-boxes or flasks provided in the middle of two opposite sides with eyes 29 having holes 28.

The working of the hereinbefore described device for bringing the molding-boxes together is as follows:

Let it be assumed, that the molding-box 27 is fixed to the turnover plate 13 and that it contains one half of a pattern as well as the material required for the molding of this pattern, as shown in full lines Fig. 1. The turnover plate 13 rests on the shaking-plate 2 imparting during its actuation a vertical shaking movement to said plate 13. For the purpose of lifting the plate and molding-box 27 into the position indicated by dotted lines Fig. 1 the shaft 11 is rotated, so that the supports 5 are raised. Upon a lifting of the turnover plate 13 the rib 16 of the clutch-half 15 is brought to engage the groove 18 of the clutch-half 17, which has in its position of rest such a position, that an engagement of said groove with the rib 16 is rendered possible. As soon as the pins 14 are on the level of shaft 19, shaft 11 is stopped, shaft 19, with the turnover plate 13 clutched thereto, is then rotated through an angle of 180° by means of the hand wheel 22, so that said plate 13 with the box 27 is moved into the position shown in Figs. 4 and 5. The turnover plate 13 is secured in this position by means of the stops 24 and 25, rail 23 being displaced in such a manner, that the stops 24 come to lie beneath the stops 25. A carriage 30 is now pushed between the shaking-plates 2 and the box 27 and the latter with the plate 13 is lowered, so that the molding-box 27 comes to rest on the carriage 30 (Fig. 4). When the molding-box 27 has been disconnected from the turnover plate 13, the latter is lifted together with the pattern fixed thereto into the previous position by rotating the shaft 11. The carriage 30 supporting the molding-box 27 with the mold is then removed from the machine. The turnover plate 13 is now turned into its initial position and lowered, a second molding-box 27' being then fixed thereto. Upon a treatment of this second mold-half on the shaking-plate 2, the supports 5 are again raised and the turnover plate 13 is again rotated through an angle of 180° by means of the hand wheel 22, in order to be then lowered as soon as it has been secured in the new position by means of the stops 24, 25. The molding-box 27' may now be placed on a support resting on the shaking-plate 2 or on a support placed on the first mold-half, while the turnover plate 13 is again raised together with the pattern.

It is now necessary to turn the molding-box containing the second mold-half a second time through an angle of 180°, in order that the form-halves may be brought into their proper position, that is, in order that those sides of the molding mass contained in the molding-boxes 27, 27' into which the patterns have been impressed come to lie opposite. To this end the supports 5 together with the turnover plate 13—which does not change its present position relatively to said supports 5—are raised to a higher level than they have been previously, said supports being raised until the slots 26 are on the level of the molding-box 27' (Fig. 5). When this is the case I push bolts 31 through the slots 26 into holes 28 of the molding-box 27' and I attach to these bolts 31 hooks 32 adapted to fill out the spaces between the supports 5 and the eyes 29 of the molding-box 27', so that any lateral displacement of said box 27' is prevented. Now the molding-box 27' is raised to such an amount by means of the supports 5, that a rotation of said box through an angle of 180° about pins 31 is rendered possible. After such movement has been imparted to said box 27' the supports 5 are again lowered, box 27' being thereby placed on the molding-box 27 (Fig. 6), as the latter has been moved between the molding-box 27' and the shaking plate 2 before the lowering of the molding-box 27'. Upon a removal of the bolts 31 and the hooks 32 the carriage 30 supporting the casting-mold completely fitted together may be removed from the machine. In order to bring the carriage 30 in an exact position with regard to the molding-boxes 27 and 27' respectively, I provide suitable stops 31 (Figs. 2 and 3).

It will be seen by the above description of the method of operation of my device, that I am able to place also the second molding-box by means of this device in a positive manner and by means of a mechanical arrangement in the exact position on the first molding-box, so that said second molding-box has not to be put on the first one by hand and the mold-parts may be brought together in a much easier and quicker manner without damaging the sand mold. Owing to this, the whole work, consisting in the bringing together, lifting and placing of the molding-boxes on each other, may also be carried out by unskilled laborers, so that the expenses arising from the bringing together of the mold-parts are considerably smaller than in the case, where the placing of the second mold-part on the first one has to be effected by a skilled hand.

What I claim is:

1. A molding-machine comprising, in combination, vertically movable supports, a turnover plate carried by said supports and adapted to take up a molding-box, means for turning over said plate, means on said supports adapting the latter to carry at a second place a molding-box and a carriage adapted to support a molding-box, said supports being adapted to put in the required exact manner the second molding-box on the first molding-box placed on said carriage by means of the turnover plate, substantially as described.

2. A molding-machine comprising, in combination, vertically movable supports, each provided at its upper end with a bearing, a turnover plate adapted to pivot in said bearings of the supports and carry a molding-box, means for turning over this plate, longitudinal slots in said supports, pins adapted to be inserted through said slots and act as trunnions for a molding-box, said slots being arranged in such a manner, that the molding-box trunnioned in said slots may be turned about the pins upon a displacement of the supports, and a carriage adapted to support a molding-box, said supports being adapted to put in the required exact manner the second molding-box on the first molding-box placed on said carriage by means of the turnover plate, substantially as described.

3. A molding-machine comprising, in combination, vertically movable supports, each provided at its upper end with a bearing, a turnover plate adapted to pivot in said bearings of the supports and carry a molding-box, means for turning over this plate, longitudinal slots in said supports, pins adapted to be inserted through said slots and act as trunnions for a molding-box, said slots being arranged in such a manner, that the molding-box trunnioned in said slots may be turned about the pins upon a displacement of the supports, means preventing a displacement of the molding-box trunnioned in said slots in the direction of its axis of rotation and a carriage adapted to support a molding-box, said supports being adapted to put in the required exact manner the second molding-box on the first molding-box placed on said carriage by means of the turnover plate, substantially as described.

4. A molding-machine comprising, in combination, vertically movable supports, each provided at its upper end with a bearing, a turnover plate adapted to pivot in said bearings of the supports and carry a molding-box, means for turning over this plate, longitudinal slots in said supports, pins adapted to be inserted through said slots and act as trunnions for a molding-box, said slots being arranged in such a manner, that the molding-box trunnioned in said slots may be turned about the pins upon a displacement of the supports, hooks adapted to be attached to said pins and fill out the spaces between the supports and the molding-box pivotally mounted on said pins and a carriage adapted to support a molding-box, said supports being adapted to put in the required exact manner the second molding-box on the first molding-box placed on said carriage by means of the turnover plate, substantially as described.

5. A molding-machine comprising, in combination, movable supports, each provided at its upper end with a bearing, means for imparting to these supports a simultaneous vertical movement, a turnover plate adapted to pivot in said bearings of the supports and carry a molding-box, means for turning over this plate, longitudinal slots in said supports, pins adapted to be inserted through said slots and to act as trunnions for a molding-box, said slots being arranged in such a manner, that the molding-box trunnioned in said slots may be turned about said pins upon a displacement of the supports, a shaking-plate adapted to act as a support for the turnover plate carrying a molding-box as well as for a molding-box into which the mold has been stamped and a carriage adapted to support a molding-box, said supports being adapted to put in the required exact manner the second molding-box on the first molding-box placed on said carriage by means of the turnover plate, substantially as described.

In testimony that I claim the foregoing as my invention, I have signed my name in presence of two subscribing witnesses.

FRIEDRICH AESCHBACH.

Witnesses:
 CARL GUBLER,
 ARNOLD LEHNER.